United States Patent [19]
Araki

[11] Patent Number: 5,180,140
[45] Date of Patent: Jan. 19, 1993

[54] HOT/COLD WATER MIXING FAUCET AND MOUNTING STRUCTURE THEREFOR

[75] Inventor: Osamu Araki, Tokoname, Japan

[73] Assignee: Inax Corporation, Tokoname, Japan

[21] Appl. No.: 663,954

[22] PCT Filed: Jul. 27, 1990

[86] PCT No.: PCT/JP90/00961
§ 371 Date: Mar. 11, 1991
§ 102(e) Date: Mar. 11, 1991

[87] PCT Pub. No.: WO91/02127
PCT Pub. Date: Feb. 21, 1991

[30] Foreign Application Priority Data

Aug. 3, 1989 [JP] Japan .................................. 1-201850
Aug. 10, 1989 [JP] Japan .............................. 1-94705[U]
Aug. 18, 1989 [JP] Japan .............................. 1-97044[U]

[51] Int. Cl.[5] ........................ F16K 31/46; F16K 31/64
[52] U.S. Cl. .................................... 251/291; 251/293; 251/294; 236/12.11; 236/12.14; 236/51
[58] Field of Search ............... 251/291, 292, 293, 294; 236/12.1, 12.11, 12.14, 51

[56] References Cited

U.S. PATENT DOCUMENTS

| | | | |
|---|---|---|---|
| 2,155,233 | 4/1939 | Mantz | 236/51 X |
| 3,036,777 | 5/1962 | Budde | 236/51 X |
| 3,355,964 | 12/1967 | Day | 251/294 |
| 4,299,354 | 11/1981 | Ketley | 236/12.11 |
| 4,325,508 | 4/1982 | Kunz | 236/51 X |

FOREIGN PATENT DOCUMENTS

| | | |
|---|---|---|
| 0193437 | 9/1986 | European Pat. Off. . |
| 2175924 | 10/1973 | France . |
| 2475181 | 8/1981 | France . |
| 0152984 | 9/1983 | Japan .............................. 236/12.11 |
| 0055485 | 3/1986 | Japan .............................. 236/12.11 |
| 478303 | 9/1969 | Switzerland . |

*Primary Examiner*—John Rivell
*Attorney, Agent, or Firm*—Kanesaka and Takeuchi

[57] ABSTRACT

Herein disclosed are a hot/cold water mixing faucet structure and a mounting structure therefor, which are installed on a lavatory sink and enabled to joint and integrate a control knob and a faucet body directly and to control the separate two at a remote position by a control cable. The faucet body (15) housing a control unit (30) for controlling the temperature and/or flow of hot water to be spouted can be integrated into the hot/-cold water mixing faucet device by separating the faucet body (15) and a control knob (16) and by jointing the two directly into the integral hot/cold water mixing faucet device through the meshing of the threads (29a and 26b). The faucet body (15) can be disposed in a different position by separating the control knob (16) and the faucet body (15) and connecting them to the ends (17a and 17b) of a removable control cable (17), and by mounting the control knob (16) on the lavatory sink (9) and so on.

8 Claims, 8 Drawing Sheets

HOT/COLD WATER MIXING FAUCET AND MOUNTING STRUCTURE THEREFOR

TECHNOLOGICAL FIELD

The present invention relates to both a hot/cold water mixing faucet, in which control knobs for controlling the temperature and flow of water to be spouted can be separated from the faucet body so that the separated control knobs may be mounted in desired positions, and a hot/cold water mixing faucet mounting structure which is enabled to control the temperature and flow of the water to be spouted, at a remote position by using such hot/cold water mixing faucet.

BACKGROUND TECHNOLOGY

FIG. 6 is a sectional front elevation showing a representative hot/cold water mixing faucet device 1 of the prior art. This faucet device 1 is arranged on a horizontal line with a temperature control knob 2, a temperature control unit 3, a hot/cold water mixing chamber 4, a flow control unit 5a and a flow control knob 5. Thus, the faucet device 1 is enabled to control the relative inflows of the hot water coming from a hot water supply passage 1b recessed in the inner circumference of a faucet body 1a and the cold water coming from a cold water supply passage 1c, by the sliding motions of a slide valve 8 which is actuated by a temperature sensitive expander 7, thereby to set the mixture to a predetermined temperature in the hot/cold water mixing chamber 4 so that it can supply the controlled water through the flow control unit 5a to a discharge conduit 6.

Incidentally, there is developed in recent years an automatic faucet device 10, as shown in FIG. 7. This faucet device 10 is enabled to spout hot water automatically merely by stretching the hands of a user toward a spout body 11, which is mounted over a lavatory sink 9, and to stop the spout automatically either after lapse of a predetermined time period or by drawing back the hands from the spout body 11. The automatic faucet device 10 is required to hold the temperature of the spout within a predetermined range at all times without being influenced by the change in the ambient temperature. In the prior art, therefore, the aforementioned hot/cold water mixing faucet device 1 may be used as the temperature control device, excepting the case in which a hot water supply or a water warmer is separately arranged. In this case, the hot/cold water mixing faucet device 1 itself is arranged below the lavatory sink 9. Moreover, the faucet device does not have the flow control unit 5a and the flow control knob 5 (as shown in FIG. 6), which are unnecessary for the function of the automatic faucet device 10, and the corresponding portions are plugged. At the same time, the flow passage from the hot/cold water mixing chamber 4 to the discharge conduit 6 is connected to a box 12 housing an electromagnetic or electric valve (although not shown). Incidentally, in the hot/cold water mixing faucet device 1 shown in FIG. 7, the temperature control knob 2 is positioned at the righthand end of the faucet body 1a (as is opposed to the arrangement shown in FIG. 6). Moreover, the electromagnetic or electric valve housed in the aforementioned box 12 is operated in response to a signal which is sent from a sensor 13 disposed at the leading end of the spout body 11.

The hot/cold water mixing faucet body 1 is arranged below the lavatory sink 9, as has been described hereinbefore. However, this shielded portion is usually dark so that the scale indicating the turning degree of the temperature control knob 2 is hard to read, thus making it difficult to confirm the control degree. In case, moreover, the set temperature is to be adjusted, the user has to stoop down to manipulate the temperature control knob 2. In addition, a fine control is almost impossible while measuring the temperature of the spout with the hands. From this background, it is earnestly desired to control the temperature of the spout in a position over the lavatory sink 9. In order to satisfy this desire, it is necessary to manufacture a special system, in which the temperature control knob 2 is made independent or in which the faucet body 1a of the hot/cold water mixing faucet device is not exemplified by the temperature control knob 2. This makes it impossible for the temperature control mechanism of the automatic faucet device 10 to make use of the ordinary faucet device 1 shown in FIG. 6. As a result, the temperature control mechanism has its production cost raised and its product control troublesome at the shops. Thus, it is the current practice that the desire cannot be easily satisfied.

Incidentally, the hot/cold water mixing faucet device of the prior art to be installed on the lavatory sink is exemplified at 51 in FIG. 8. This hot/cold water mixing faucet device 51 is given a water dispensing function and a thermostating function and is equipped with a temperature control knob 52, a flow control knob 53 and a spout body 54, all of which are mounted on the top surface of a lavatory sink 55. By controlling the flow control knob 53, the water supply can be automatically stopped after having been dispensed by an arbitrary flow, or a desired flow can be continuously spouted. By controlling the temperature control knob 52, moreover, the water to be spouted can be controlled to a desired temperature. In this case, the thermostat detects the temperature of the water to be spouted and controls the axial position of the control valve so as to correct the deviation, if any, from the set temperature so that the spout can be automatically controlled to the temperature.

Thus, in the hot/cold water mixing faucet device 51, the temperature control knob 52 and the flow control knob 53 are usually disposed in the back of the lavatory sink 55. As a result, the control operation has to be accomplished with the hands being stretched deep of the lavatory sink 55. Moreover, those knobs 52 and 53 are erected on the top surface of the sink 55. As a result, the knob controls have to be accomplished troublesomely with the arm being stretched and the wrist being bent to turn.

DISCLOSURE OF THE INVENTION

An object of the present invention is to provide a hot/cold water mixing faucet device (which may be called the "faucet device of the prevent invention") which is enabled to separate the temperature and flow control knobs of water to be spouted, from the faucet body so that the separated control knobs can be either jointed to the faucet body or arranged on the top surface of a lavatory sink or a counter, whereby the temperature and flow of the spout can be easily controlled by the automatic faucet body while suppressing the rise in the production cost of the hot/cold water mixing faucet device.

Another object of the present invention is to provide a novel mounting structure or a remote control structure (which may be called the "remote control structure of the present invention") for the hot/cold water mixing faucet device, which is enabled to control the temperature and flow of the spout easily over the top surface of the lavatory sink even in case the faucet body is mounted below the lavatory sink, for example.

Still another object of the present invention is to provide a knob mounting structure (which may be called the "knob structure of the present invention") which can be easily controlled.

The faucet device of the present invention comprises: a control mechanism including a temperature control unit and a flow control unit for water to be spouted; a faucet body housing said control mechanism therein and having its end opened at a portion corresponding to the control input end of said control mechanism; and a control knob connected directly or indirectly to the control input end of said control mechanism, wherein said control knob is provided with at the root of its control portion with a head longer than the thickness of the top of a lavatory sink or a counter and in the outer circumference of said head with an external thread, and wherein said faucet body has its open end formed with a mounting thread to be screwed on the external thread of said control knob or the internal thread formed in the inner circumference of said head.

In this mode, the top surface of the lavatory sink or the counter is formed with the mounting hole, and the head of the control knob is inserted into the mounting hole. Then, the head has its externally threaded portion protruding to the back of the top surface of the lavatory sink or the counter. As a result, the control knob can be mounted in the top surface of the lavatory sink or the counter by fastening a nut on the external thread of the head. Moreover, the control knob can also have its head screwed in the mounting thread formed in the open end of the faucet body.

The remote control structure of the present invention comprises: a faucet body housing a temperature control unit therein; a control knob mounted on the top surface of a lavatory sink or a counter; and a control cable for connecting said faucet body and said control knob to each other, wherein the temperature control unit in said faucet body includes: a slide valve for controlling the relative openings of a hot water supply passage and a cold water supply passage leading to a hot/cold water mixing chamber with a heat sensitive expander; and a slide limiter for regulating the sliding region of said slide valve, wherein said control knob has a rotation output end or a linear output end connected through a motion converter to said rotation output end, and wherein said control cable has its one end connected to the output end of said control knob and its other end connected directly or indirectly to said slide limiter or a spout control valve disposed in said faucet body.

In this mode, in order to control the temperature and flow of the hot water to be spouted at the top surface of the lavatory sink, the control knob is separated from the faucet body but connected to each other through the control cable. This control valve transmits the turn or linear motion of the control knob, if turned, as it is to the faucet body. In this faucet body, therefore, the temperature or flow control is accomplished by the mechanism similar to that of the hot/cold water mixing faucet device of the prior art.

According to the knob mounting structure of the present invention, the faucet is arranged such that the knob body is inclined toward the user with respect to the mounting surface.

In this mode, the knob body is inclined with respect to the mounting surface of the lavatory sink or the like, and this inclination is directed toward the user. This allows the user to grip and operate the knob body while stretching his arm but not with the bent wrist so that this operation is suited for the human engineering.

BEST MODE FOR CARRYING OUT THE INVENTION

Figure 2:
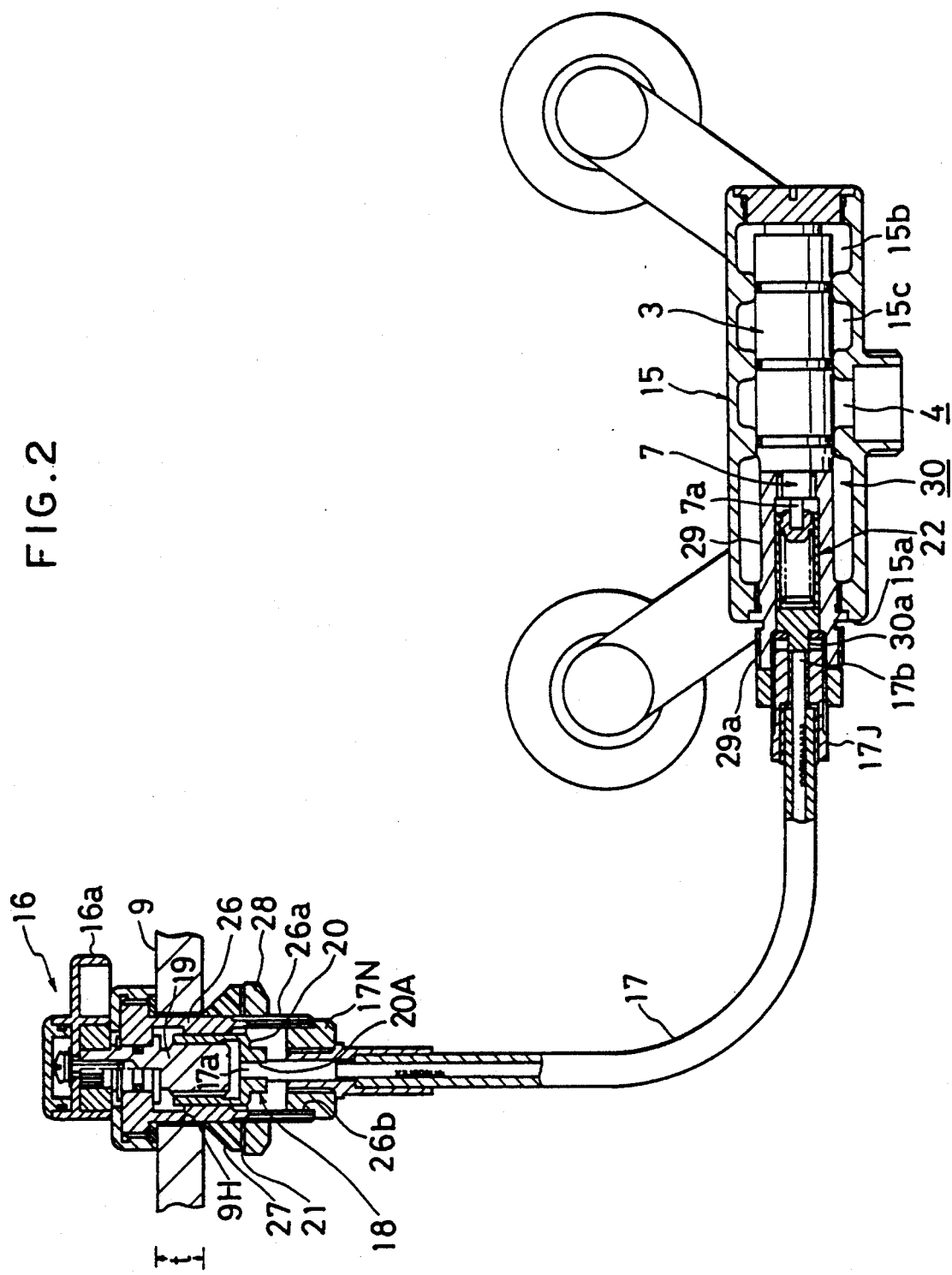
FIG. 2 is a sectional front elevation showing the faucet device of the present invention in the state, in which the control knob and the faucet body are separated.
Figure 3:
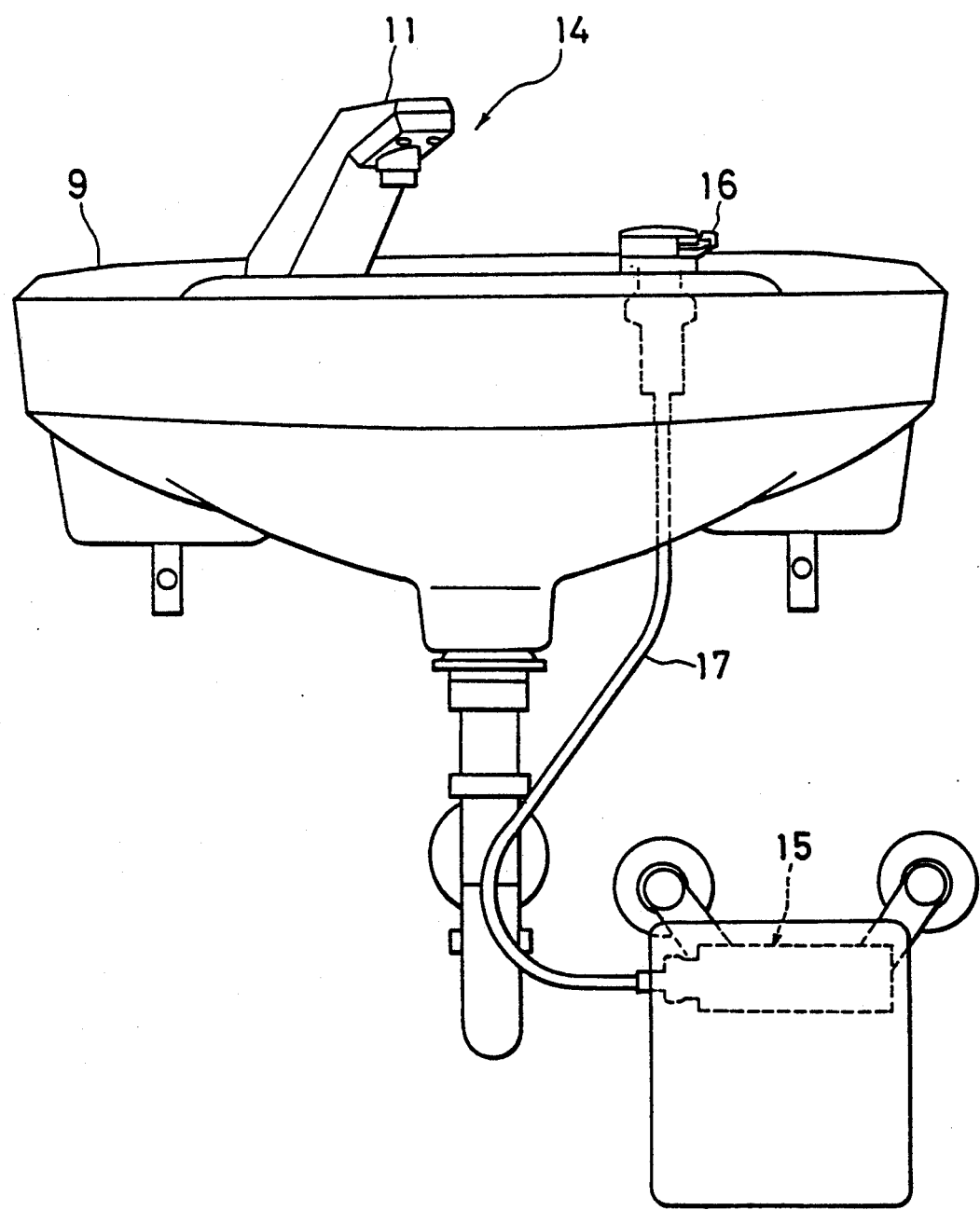
FIG. 3 is a front elevation showing the remote control structure of the present invention under a situation, in which the exemplified automatic faucet device is mounted on the lavatory sink.

FIG. 3 is a front elevation showing the situation, in which an automatic faucet device 14 according to the remote control structure of the present invention is installed on a lavatory sink 9, and FIG. 2 is a section showing the state in which a control knob 16, a faucet body 15 and a cable 17 are connected. On the top surface of the lavatory sink 9, there is mounted the control knob 16 which is located adjacent to a spout body 11. The control knob 16 is connected through the control cable 17 to the faucet body 15 which is mounted below the lavatory sink 9. The control cable 17 is composed of a flexible tube and a wire cable inserted into the flexible tube, so that it can transmit the control force of the control knob 16 to the temperature control unit (although not shown) housed in the aforementioned faucet body 15. As a result, the user is allowed to control the hot water being spouted from the spout body 11 while receiving the spout directly with his hand and to perform the control easily in his remarkably natural standing position. Incidentally, the water supply tube and the wiring line for connecting the faucet body 15 and the spout body 11 are not shown.

The control knob 16 and the faucet body 15 will be individually described with reference to FIG. 2.

The control knob 16 is composed of: a lever 16a; a turn pin 19 having the lever 16a fixed thereto by means of a screw; a motion converter 18 for converting the rotations of the turn pin 19 on the axis into the forward and backward movements in the axial direction; and a cylindrical head 26 fitting the turn pin 19 and the motion converter 18 therein. The head 26 is formed to have a length three times as large as the thickness t of the top of the lavatory sink 9 and is formed with an external (or male) thread 26a in its outer circumference. As a result, if the head 26 is inserted into a mounting hole 9H formed in the top of the lavatory sink 9, it protrudes to the two thirds of the length of the head 26 to the back of the top of the lavatory sink 9. At the back of the top of the lavatory sink 9, a conical packing 27 and a washer 21 are fitted on the head 26 of the control knob 16, and a nut 28 is fastened. Then, the control knob 16 is fixed on the top of the lavatory sink 9.

The motion converter 18 is made movable back and forth in the axial direction along the inner face of the aforementioned cylindrical head 26. The aforementioned turn pin 19 is formed with an external thread meshing with an internal thread of the socket 20. This socket 20 is fitted to be axially irrotatable with respect to the inner circumference of the head 26. In case the lever 16a is turned, the socket 20 is linearly slid in the axial direction because it is blocked against any rotation by the inner circumference of the head 26. To the bottom hole 20A of the socket 20, there is connected to the input end 17a of the control cable 17. To this end of the cable 17, there is fixed a nut 17N which is screwed in the internal thread 26b formed in the inner circumference at the lower end of the head 26.

Figure 6:
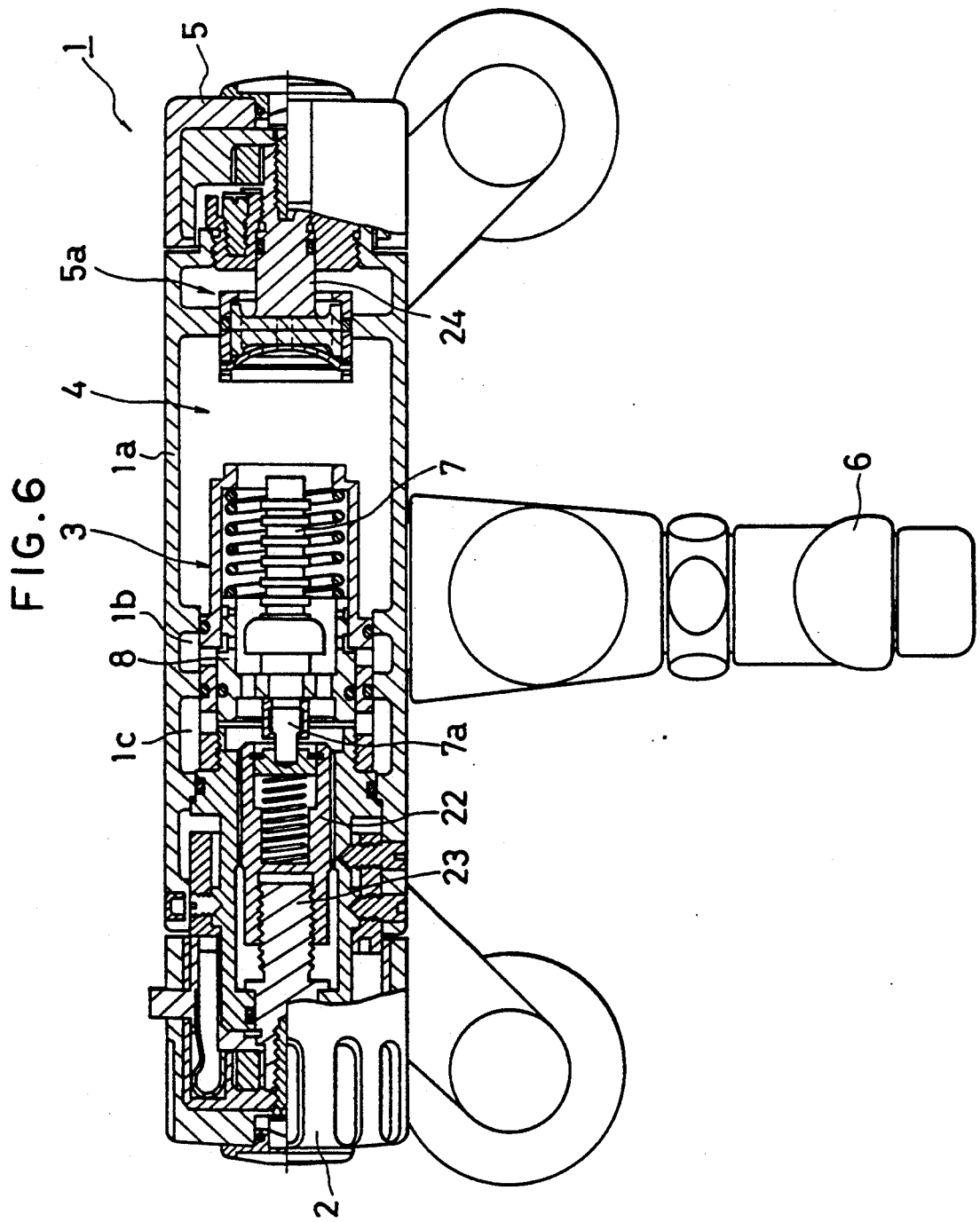
FIG. 6 is a sectional front elevation showing a representative hot/cold water mixing faucet device of the prior art.
Figure 7:
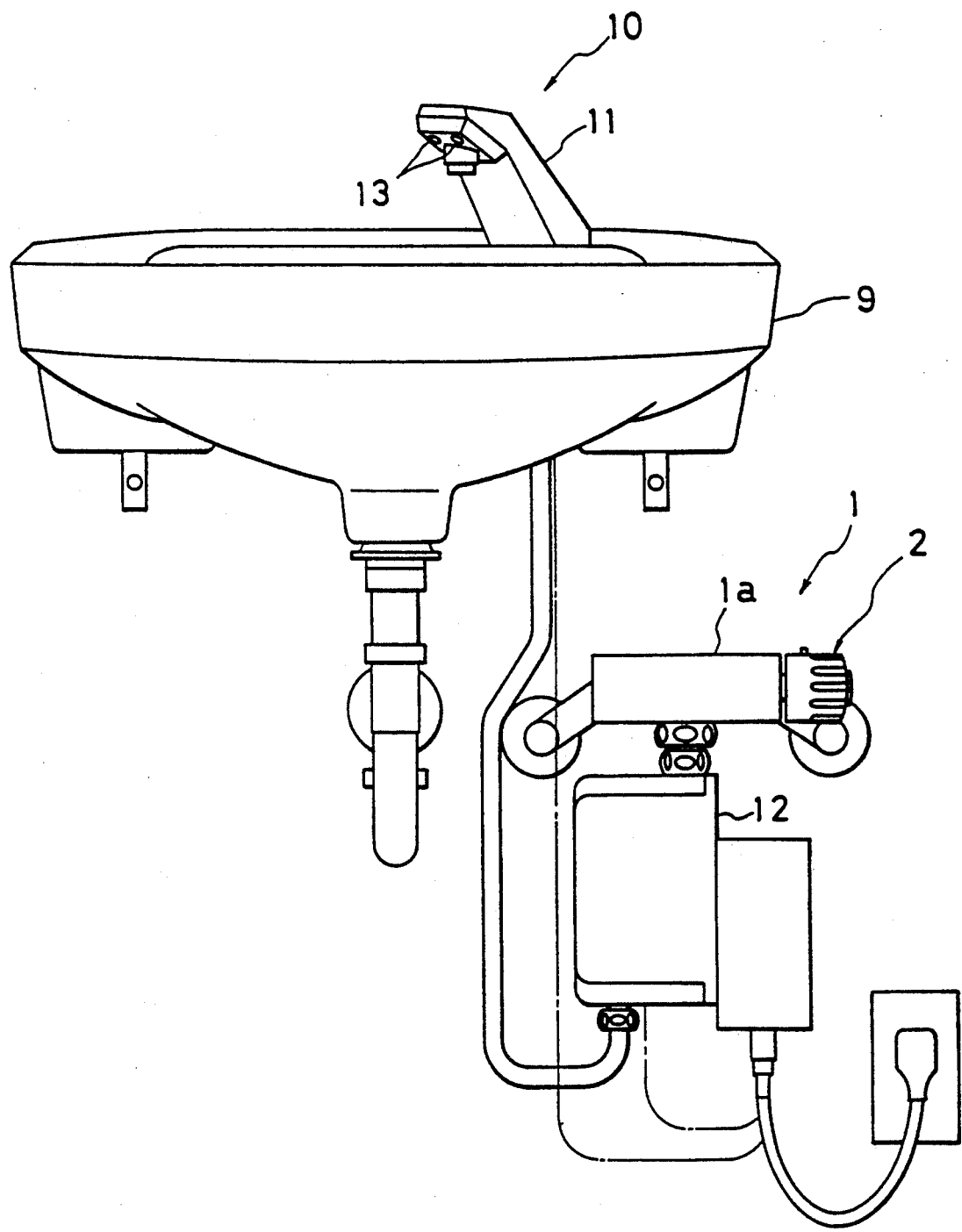
FIG. 7 is a front elevation showing the situation, in which the automatic faucet device of the prior art is mounted on the lavatory sink.
Figure 8:
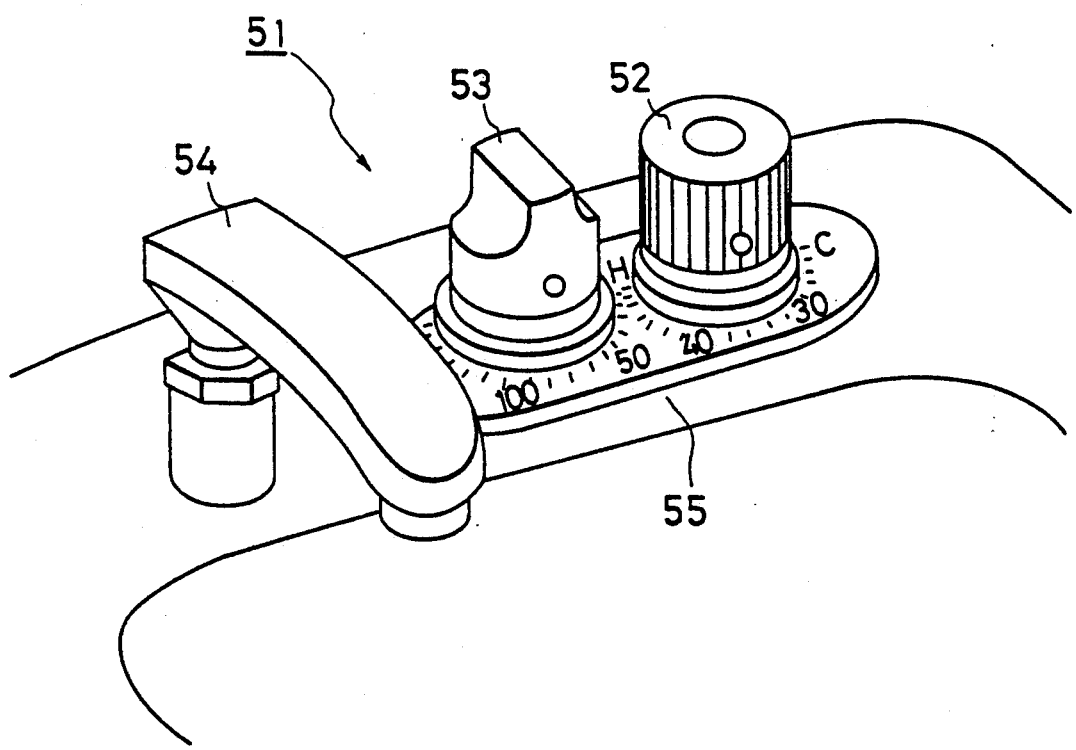
FIG. 8 is a perspective view showing the hot/cold water mixing faucet device of the sink surface mounted type of the prior art.

In the aforementioned faucet body 15, there is housed a temperature control unit 3 which has its outer circumference surrounded by a hot/cold water mixing chamber 4, a hot water supply passage 15b and a cold water supply passage 15c. Incidentally, there protrudes from one end (i.e., the lefthand end of the drawing) of the temperature control unit 3 the piston 7a of a temperature sensitive expander 7 (as shown in FIG. 6). The aforementioned faucet body 15 is opened, as indicated at 15a, at its end corresponding to the piston 7a. In this open end 15a, there is fitted through a cylindrical housing 29 a slide limiter 22. This slide limiter 22 is allowed to have its position changed in its insertion and removal directions within the aforementioned housing 29 and is always held in abutment against the piston 7a of the aforementioned heat sensitive expander 7. Specifically, if the slide limiter 22 is shifted outward (i.e., to the left of FIG. 2) within the housing 29, the heat sensitive expander 7 is also moved to the left of FIG. 2 so that the slide valve (as indicated at numeral 8 in FIG. 6 although not shown in FIG. 2) to be moved back and forth by the heat sensitive expander 7 comes into a state in which the opening of the cold water supply passage 15c is larger than that of the hot water supply passage 15b. As a result, the temperature of the water to be spouted is dropped. If, on the contrary, the slide limiter 22 is shifted to the right of FIG. 2 within the housing 29, the heat sensitive expander 7 is moved to the right of FIG. 2 to raise the temperature of the spout. The slide limiter 22 thus far described constitutes a temperature control mechanism 30 together with the housing 29 and the heat sensitive expander 7. In this temperature control mechanism 30, moreover, the end of the slide limiter 22, which protrudes from the inside of the housing 29 to the outside of the faucet body 15, constitute the control input terminal 30a of the temperature control mechanism 30.

In the present embodiment, there is connected to the control input terminal 30a the output end 17b of the aforementioned control cable 17. Specifically, this cable 17 has its end fixing thereon a cylindrical joint 17J which is screwed in the end of the cylindrical housing 29. If the lever 16a of the aforementioned control knob 16 is turned, the slide limiter 22 in the temperature control mechanism 30 of the faucet body 15 is slid into and out of the housing 29 to control the temperature of the water to be spouted.

Figure 1:
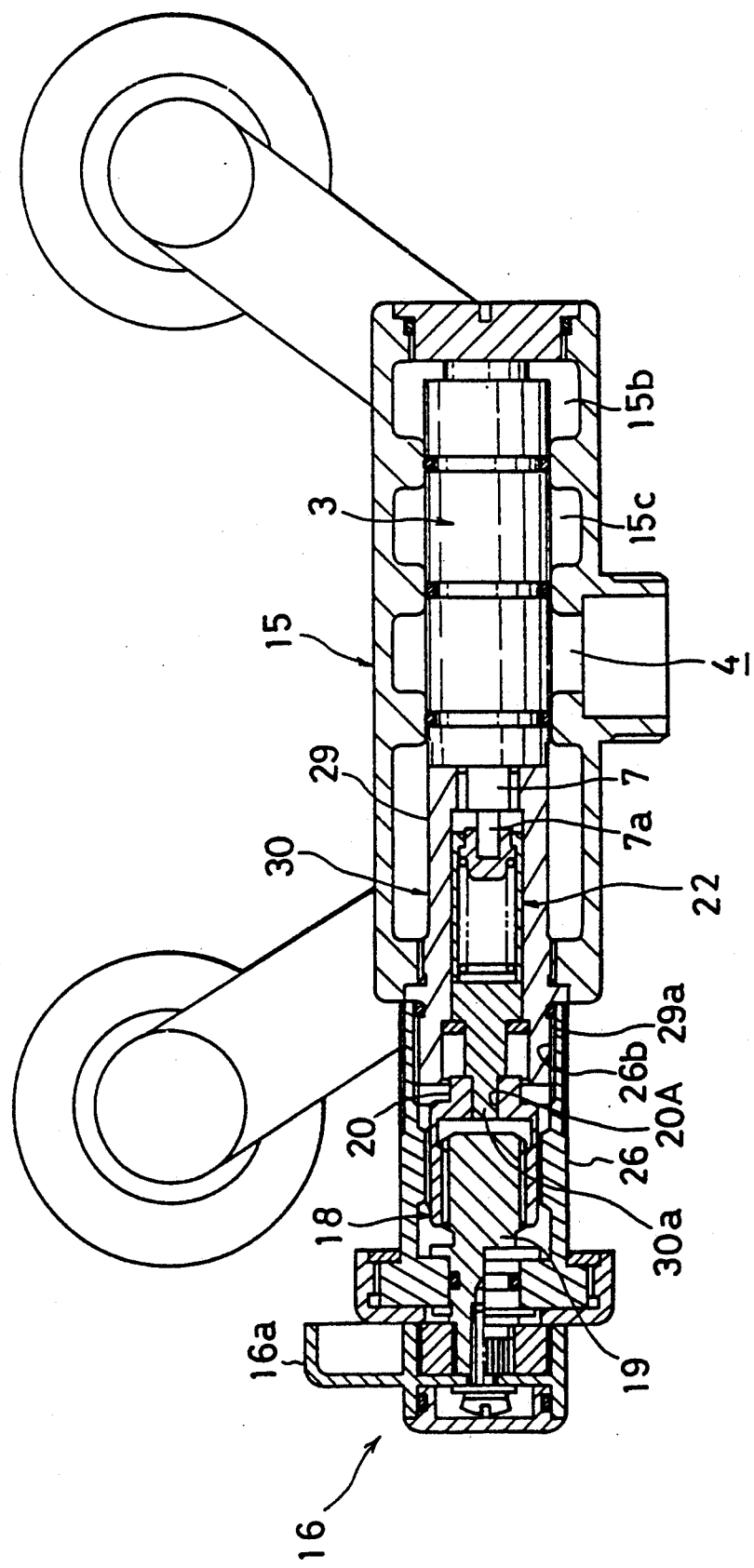
FIG. 1 is a sectional front elevation showing the faucet device of the present invention in the state, in which the control knob and the faucet body are jointed.

The housing 29 protruding from the open end 15a of the faucet body 15 is formed in its outer circumference with an external thread 29a. Moreover, the external diameter of the external thread of the housing 29 is equal to the internal diameter of the internal thread 26b of the aforementioned head 26. As a result, the control knob 16 and the faucet body 15 can be jointed at the aforementioned internal thread 26b and external thread 29a by removing the control knob 16 from the top of the lavatory sink 9 and by removing the control cable 17 from both the control knob 16 and the faucet body 15. This state is shown in FIG. 1. In case the control knob 16 and the faucet body 15 are to be jointed, as shown in FIG. 1, the control input end 30a (or the end of the slide limiter 22) of the temperature control mechanism 30 of the faucet body 15 is fitted directly in the bottom hole 20A of the socket 20 of the motion converter 17 in the control knob 16.

As could be apparent from FIGS. 1 to 3, the control knob 16 can be jointed to or separated from the faucet body 15. Thus, the faucet body of the present invention can be used either solely, as is installed in the jointed state of FIG. 1 in a bathroom, a kitchen or a lavatory, or in the separate state of FIGS. 2 and 3 as the temperature adjusting mechanism of an automatic faucet device.

The motion converter 18 is housed in the control knob 16 in the embodiment thus far described but may be housed in the faucet body 15. Moreover, the control knob 16 should not be limited to those for controlling the temperature of the water to be spouted but may be applied to a flow controller. In the foregoing embodiment, furthermore, the control knob 16 is formed with the internal thread 26b whereas the faucet body 15 is formed with the external thread 29a so that the control knob 16 and the faucet body 15 may be jointed. Despite of this structure, however, the present invention should not be limited thereto but can be modified such that the external thread 26a of the head 26 of the control knob 16 is screwed in an internal thread, if any, in the inner circumference of the extension of the open end 15a of the faucet body 15. In these ways, the structure and shape of the faucet device of the present invention can be suitably modified according to the modes of embodiment.

Figure 4:
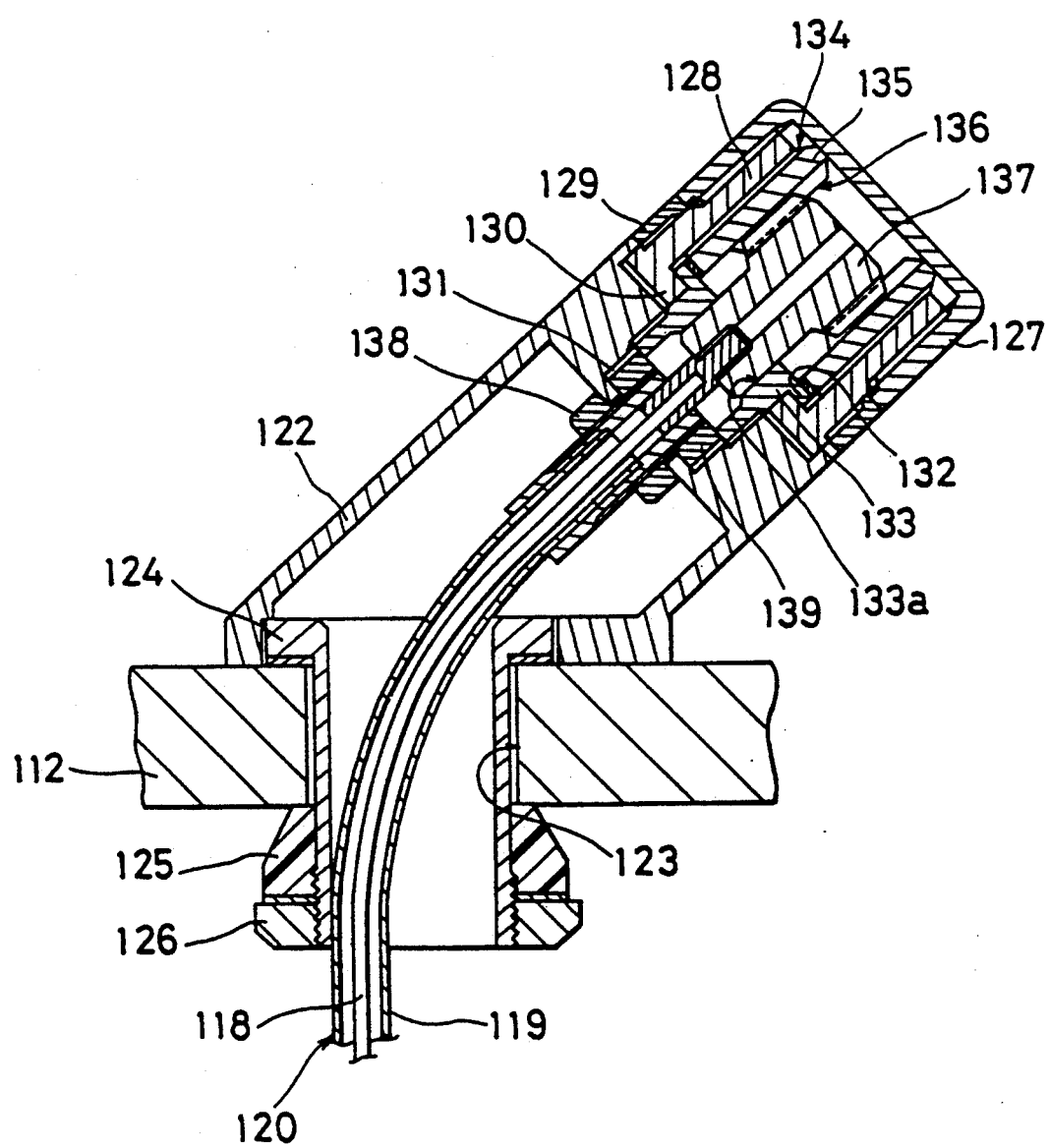
FIG. 4 is a longitudinal section showing the temperature control knob.
Figure 5:
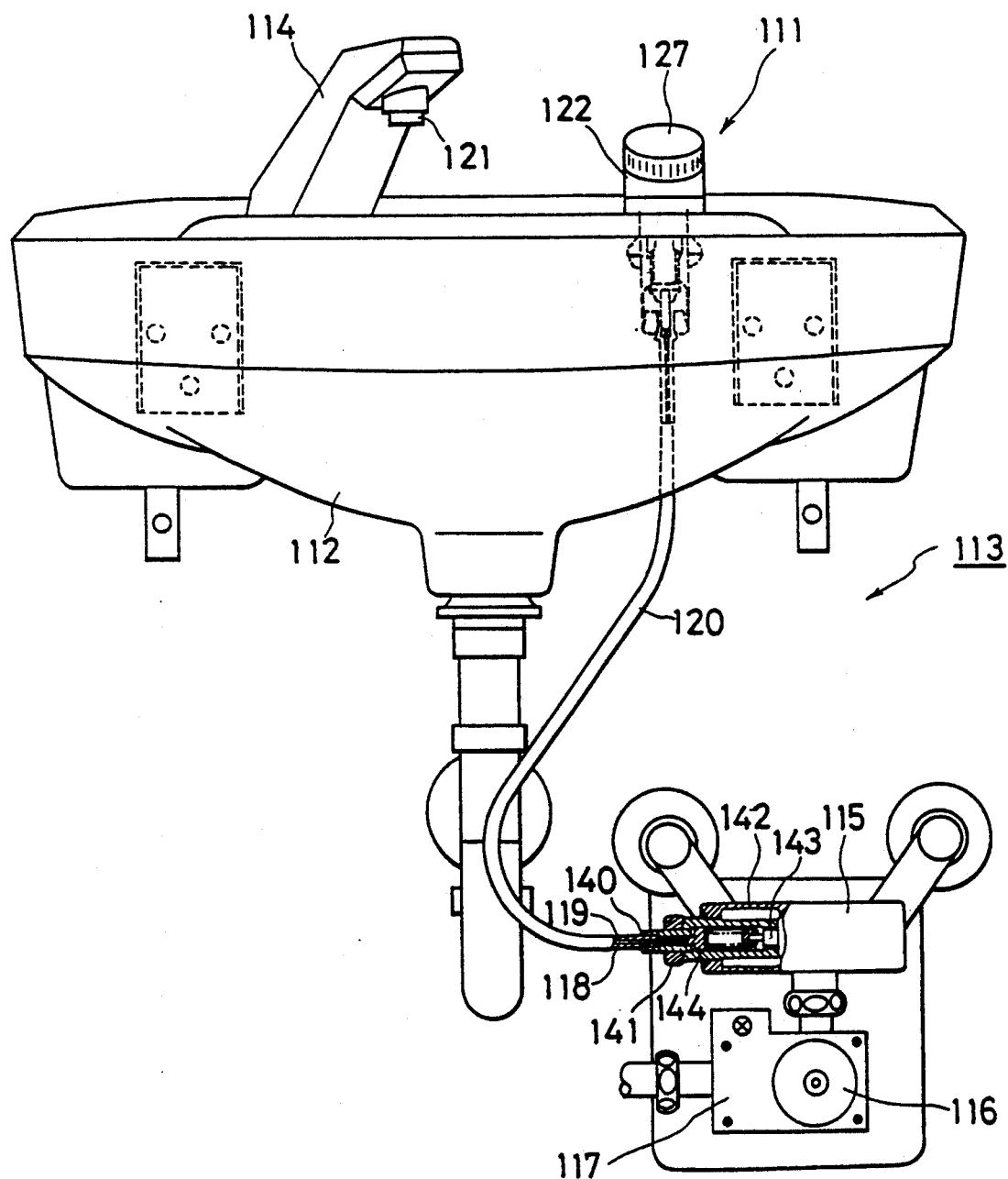
FIG. 5 is a front elevation showing the whole structure of the automatic faucet device mounted on the lavatory sink.

In FIGS. 4 and 5 showing one embodiment of the knob mounting structure of the present invention, FIG. 4 is a longitudinally sectional side elevation showing a temperature control knob 111, and FIG. 5 is a front elevation showing the whole structure of an automatic faucet device 113 installed on a lavatory sink 112. In this automatic faucet device 113, as shown in FIG. 5, a spout body 114 and the temperature control knob 111 are mounted on the top surface of the lavatory sink 112. Below the lavatory sink 112, there are also mounted a hot/cold water mixing faucet 115 and a water stopper 117 equipped with an electromagnetic valve 116. The aforementioned temperature control knob 111 is connected with the hot/cold water mixing faucet 115 through a push-pull cable 120 composed of an inner cable 118 and an outer cable 119. In the vicinity of the port 121 of the spout body 114, there is mounted a sensor (although not shown) for detecting the stretched hand of the user to turn on or off the electromagnetic valve 116 of the water stopper 117.

The temperature control knob unit 111 has its knob body 122 disposed at an inclination on the mounting surface of the lavatory sink 112, as shown in FIG. 4. Moreover, this inclination is directed toward the user. As a result, the user can control the control knob 127 (as will be described hereinafter) of the knob body 122 while having his arm stretched but his wrist not bent so that the controls are made smoothly in the human engineering. The temperature control knob unit 111 is mounted by inserting the threaded cylinder of a base plate 124 into the mounting hole 123 of the lavatory sink 112 and by fastening a triangular packing 125 and a nut 126 from the lower side of the lavatory sink 112.

To the upper end of the knob body 122, on the other hand, there is attached the cup-shaped control knob 127 which is directed downward and made turnable. The control knob 127 has a cylindrical liner member 128 screwed in its inner circumference, and the knob 127 and the liner member 128 are fastened by a double nut 129. The liner member 128 is formed with a flange 130 on the inner circumference of its lower end. In a recess formed in the upper end of the knob body 122, on the other hand, there is screwed an inner member 133 which is formed with a flange on the outer circumference of its upper end. The flange 130 of the aforementioned liner member 128 is engaged with the flange 132 of the inner member 133 so that it is prevented from coming out. As a result, the control knob 127 thus integrated with the liner member 128 can be turned at the upper end of the knob body 122.

In the inner circumference of the aforementioned liner member 128, there is fitted through a spline 134 a cylindrical intermediate member 135. In the inner circumference of the intermediate member 135, on the other hand, there is fitted through a thread 136 a slider 137 which is connected to one end of the inner cable 118. Incidentally, the slider 137 has its lower portion fitted in a hexagonal hole 133a of the aforementioned inner member 133. The output cable 119 is fixedly connected through nuts 138 and 139 to the upper end of the knob body 122.

At the other end of the push-pull cable 120, the outer cable 119 has its root 140 fixed to a faucet body 142 by a cap nut 141. The inner cable 118 has its leading end connected to a slider 144 for controlling the axial position of a temperature control valve 143.

Next, the operation modes of the automatic faucet device 113 thus constructed will be described in the following.

First of all, if the user stretches his hand to below the spout body 114 mounted on the top of the lavatory sink 112, this stretch is detected by the sensor to turn on (or open) the electromagnetic valve 116. As a result, the hot water, which has been controlled to the desired temperature by the hot/cold water mixing faucet 115, is spouted from the port 121 of the spout body 114. In case the temperature of the hot water to be spouted is to be set or changed, the control knob 127 may be turned.

This turn of the control knob 127 is transmitted to the liner member 128 and the intermediate member 135 and further through the threaded portion 136 to the slider 137. Since this slider 137 is blocked against is turn by the hexagonal hole 133a, it is moved in the axial direction. In other words, the rotation of the control knob 127 is converted into the axial movement of the slider 137. As a result, the inner cable 118 is pushed or pulled. This motion of the inner cable 137 is transmitted to the slider 144 for controlling the axial position of the temperature control valve 143 of the hot/cold water mixing faucet 115. Therefore, the axial position of the temperature control valve 143 can be controlled to set and change the temperature of the hot water to be spouted.

Incidentally, in case the automatic faucet device 113 is to be interrupted, the hand is drawn from below the spout body 114. Then, this draw is detected by the sensor so that the electromagnetic valve 116 is turned off (or closed) to end the spout of the hot water.

Incidentally, the present invention should not be limited to the embodiments thus far described but can be suitably modified. For example, the present invention can be applied not only the automatic faucet device 113 but also an ordinary hot/cold water mixing faucet device to be installed on a table. Moreover, the present invention can be used with not only the temperature control knob unit 111 but also a flow control knob of needle type. By connecting the control knob 127 of the knob body 122 and the slider 144 of the hot/cold water mixing faucet 115, still moreover, the knob body 122 can be disposed at an inclination on the top of the lavatory sink 112.

INDUSTRIAL APPLICABILITY

As is now apparent from the description thus far made, the faucet device of the present invention can joint or separate the control knob to and from the faucet body suitably in accordance with the various conditions of the place for its installation. This makes it unnecessary to manufacture the faucet device in the mode especially for the automatic faucet elaborately, apart from the modes to be used in a bath room, a kitchen or a lavatory. Moreover, the product control at the shop side can be facilitated. Since, still moreover, the control knob and the faucet body are assembled separately from each other, there can be attained the various excellent advantages that the complexity of structure and the complicatedness of assembly can be eliminated.

According to the remote control structure of the present invention, the temperature and flow controls of the hot water to be spouted can be accomplished easily and accurately especially in case of the automatic faucet device. Moreover, the position for mounting the faucet body is not restricted in connection with the controls and conveniences so that the faucet body can be mounted in a hidden state in the bath room, the kitchen and the lavatory to provide a neat appearance. Still moreover, there is no necessity for attaching the temperature control knob, the motion converter, the flow control knob or its valve member to the faucet body. As a result, the structure can be simplified to give the various excellent advantages including the facilitated production, the low production cost and the improved appearance.

In the knob mounting structure of the present invention, on the other hand, the knob body is mounted to be inclined on the surface of the lavatory sink, and this inclination is directed toward the user. This allows the user to grip and operate the control knob of the knob body while stretching his arm but not with the bent wrist. This operation is suited for the human engineering so that the knob mounting structure can be used with remarkable comfortableness.

I claim:
1. A hot/cold water mixing faucet device comprising:
   a control mechanism for controlling temperature of hot water to be spouted and having a control input end, a faucet body housing the control mechanism, said control input end of said control mechanism protruding from one end of the faucet body;

a cable having first and second ends, a sink having a hole, and a control knob having a cylindrical head to be inserted into the hole of the sink and a joint, said joint being removably connected to one of the control input end of said control mechanism and the first end of the cable such that when the control knob is to be located adjacent the control mechanism, the joint of the control knob is directly engaged with the control input end, and when the control knob is to be located away from the control mechanism, the joint of the control knob is engaged with the first end of the cable and the second end of the cable is engaged with the control input end.

2. A hot/cold water mixing faucet device comprising:

a control mechanism for controlling temperature of hot water to be spouted and having a control input end at one side of the control mechanism, temperature of water being controlled when the control input end is adjusted, a faucet body housing the control mechanism, said control input end of said control mechanism protruding from one end of the faucet body;

a cable having first and second ends, and a control knob having a joint, said joint being removably connected to one of the control input end of said control mechanism and the first end of the cable such that when the control knob is to be located adjacent the control mechanism, the joint of the control knob is directly engaged with the control input end, and when the control knob is to be located away from the control mechanism, the joint of the control knob is engaged with the first end of the cable and the second end of the cable is engaged with the control input end, said control mechanism being disposed near pipes for supplying water while the control knob is disposed at a desired place easily to be handled by a user without substantially changing the control mechanism and the control knob.

3. A hot/cold water mixing faucet device according to claim 2, wherein said control mechanism controls not only the temperature but also the flow of the hot water to be spouted.

4. A hot/cold water mixing faucet device according to claim 2, wherein said control knob includes:

a cylindrical head to be inserted into a hole of a lavatory sink or a counter;

a socket arranged in said head and allowed to move back and forth in the axial direction of said head but to rotate on said axis, said socket being formed at its one end with a threaded hole extending in said axial direction and having its other end removably connected to said first end of said control cable;

a turn pin having an external thread screwed in the threaded hole of said socket and made rotatable on the axis with respect to said head but immovable back and forth in said axial direction; and a lever attached to said turn pin.

5. A hot/cold water mixing faucet device according to claim 2, wherein said faucet body is arranged in a position different from said control knob.

6. A hot/cold water mixing faucet device according to claim 2, wherein said faucet body includes a slide valve for controlling relative openings of a hot water supply passage and a cold water supply passage leading to a hot/cold water mixing chamber by a heat sensitive expander, and a slide limiter for limiting the sliding range of the slide valve.

7. A hot/cold water mixing faucet device according to claim 2, wherein said control knob includes one of a rotation output end and a linear output end connected to a rotation output end through a motion converter.

8. A hot/cold water mixing faucet device according to claim 2, wherein said control cable has one end connected to the output end of said control knob and the other end connected to a slide limiter or a spout control valve disposed in said faucet body.

* * * * *